July 2, 1957 P. P. LOVE 2,798,005
POROUS METAL BEARING CONTAINING POLYTETRAFLUOROETHYLENE
AND A SOLID LUBRICANT
Filed Oct. 13, 1952
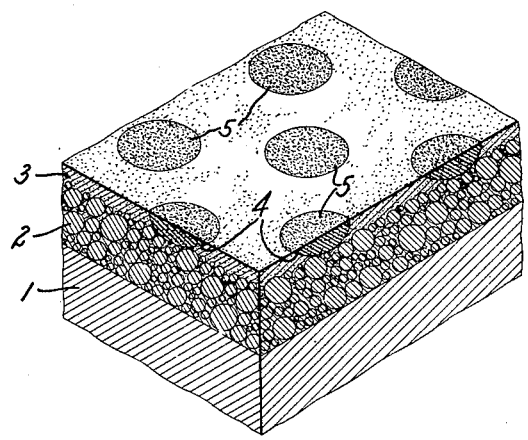
INVENTOR
Phil Prince Love
BY Pierce, Scheffler & Parker
ATTORNEYS

2,798,005

PORUS METAL BEARING CONTAINING POLY-TETRAFLUOROETHYLENE AND A SOLID LUBRICANT

Phil P. Love, Alperton, Wembley, England, assignor to The Glacier Metal Company Limited, Wembley, England, a British company Application October 13, 1952, Serial No. 314,574

Claims priority, application Great Britain October 19, 1951

2 Claims. (Cl. 117—8)

This invention relates to plain bearings, such as journal bearings or bearing liners, thrust bearings or the like.

It has before been proposed to provide a bearing bush or liner with a working surface of, or incorporating, poly-tetra-fluoro-ethylene, and it has been found that within limits such bearings will function effectively without lubrication. Furthermore, it has been proposed to provide a working surface of a bearing or journal with an impregnation or bearing surface film of molybdenum disulphide for the same purpose.

It has been found that improved anti-friction properties are obtainable if at least a surface smear of poly-tetra-fluoro-ethylene is provided on one element of a bearing assembly and a film or coating of molybdenum disulphide on the surface of the other element. Thus, a journal bearing may have a working surface incorporating poly-tetra-fluoro-ethylene and a journal may have a working surface coated with a solid lubricant, such as molybdenum disulphide.

The present invention has for its object to provide a plain bearing whereby improved results may be obtained with preparation of the bearing only.

According to the present invention, a plain bearing comprises a metallic structure incorporating poly-tetra-fluoro-ethylene so as to provide a bearing surface in which the metal is covered by at least a smear or continuous film of poly-tetra-fluoro-ethylene, characterised in that the bearing surface also is provided with dispersed cavities, such as pores, pits, pockets or the like containing a solid lubricant capable of forming a film on the surface of a rotatable element running against the bearing surface.

More specifically, the invention includes a plain bearing in which poly-tetra-fluoro-ethylene is incorporated in at least the bearing surface of a metallic structure to provide a surface which in use is predominantly poly-tetra-fluoro-ethylene and in which a solid lubricant is incorporated in dispersed cavities in the bearing surface to provide a supply of the solid lubricant for forming a film on the surface of a rotatable element running against the bearing surface.

Molybdenum disulphide is preferred as the solid lubricant referred to, but any other suitable solid lubricant may be employed, for example, graphite, camphor, boron nitride, tungsten disulphide, lead-di-iodide, lead sulphide, silver sulphate, stannic sulphide, cadmium iodide or $\alpha$ mercapto-palmitic acid.

Preferably the plain bearing according to the invention comprises a porous metallic matrix having at least the surface pores filled with poly-tetra-fluoro-ethylene, the surface incorporating the poly-tetra-fluoro-ethylene being formed with dispersed indentations filled with a solid lubricant.

The porous metallic matrix, which may be steel-backed, may be produced by sintering metallic powders and preferably has a copper-base composition, e. g. copper-tin.

In carrying the invention into effect according to one embodiment, a plain bearing comprises a porous matrix preferably steel-backed and consisting of a copper-tin bronze containing about 10% tin made by sintering from metallic powders or pre-alloyed powder in the conventional manner. The pores are filled with poly-tetra-fluoro-ethylene and applied in suspension in a suitable carrier, such as alcohol, under the influence of alternately applied vacuum and atmospheric pressure or super-atmospheric pressure to ensure filling of the pores. Sufficient poly-tetra-fluoro-ethylene may be applied to leave a surface film over the exposed metal or at least to provide for the formation of a surface smear over the metal in use. The bearing surface incorporating poly-tetra-fluoro-ethylene is then formed with dispersed surface cavities, such as pits, as by the use of a conventional ball indentator, and these cavities are filled with a solid lubricant, such as molybdenum disulphide. The molybdenum disulphide preferably is applied in the form of a paste consisting of molybdenum disulphide in a pure vegetable syrup, such as a sugar syrup, and the whole is then heated at about 300° C. until the syrup has reached a suitable decomposition form. The resultant material is pressed into the cavities by any suitable means and further applications of the paste, followed by baking and pressing, are carried out until the cavities are filled, three cycles of treatment usually being sufficient. Alternatively, an excess of the paste is spread on, heated and pressed, and the excess molybdenum disulphide-containing material removed by a final scraping or machining operation.

An embodiment of the invention is illustrated in the accompanying drawing in which the figure is a greatly magnified fragmentary sectional perspective view of a plain bearing.

As shown the bearing comprises a solid metal backing layer 1, a porous metallic layer 2, a layer 3 of polytetrafluoroethylene which consists of a very thin continuous film on the surface of the layer 2 with integral projections extending into the pores of said layer 2, and pits or cavities 4 containing a solid lubricant 5.

It will be understood that the invention is not limited to the particular embodiment hereinbefore described. For example, the metallic matrix may consist of a composite sintered structure the surface of which is rendered porous by selective etching of one component, or a porous or receptive surface may be produced by chemical or electrochemical treatment of a metallic surface as by phosphating or anodic etching. Furthermore, the solid lubricant, such as molybdenum disulphide, may be filld into the dispersd cavities by application as a suspension in a suitable carrier liquid preferably under the influence of alternate vacuum and atmospheric pressure, or super-atmospheric pressure.

I claim:

1. A plain bearing comprising a porous metallic matrix layer, a baring surface layer of poly-tetra-fluoro-ethylene extending into the pores of the metallic matrix, said bearing surface layer of poly-tetra-fluoro-ethylene having dispersed cavities in the surface thereof, said cavities being open to atmosphere and a filling of non-resinous solid lubricant in said cavities and capable of being withdrawn therefrom for forming a film on the surface of a rotatable element running against the bearing surface.

2. A plain bearing comprising a porous metallic matrix layer, a bearing surface layer of poly-tetra-fluoro-ethylene extending into the pores of the metallic matrix, said bearing surface layer of poly-tetra-fluoro-ethylene having dispersed cavities in the surface thereof open to the atmosphere and a filling of molybdenum disulphide in said cavities for forming an adherent film on the surface of a rotatable element running against the poly-tetra-fluoro-ethylene bearing surface layer.

(References on following page)

References Cited in the file of this patent

UNITED STATES PATENTS

| | | |
|---|---|---|
| 2,187,086 | Koehring | Jan. 16, 1940 |
| 2,219,054 | Palm et al. | Oct. 22, 1940 |
| 2,599,726 | Schluchter | June 10, 1952 |
| 2,689,380 | Tait | Sept. 21, 1954 |
| 2,695,425 | Stott | Nov. 30, 1954 |
| 2,703,768 | Hall | Mar. 8, 1955 |

FOREIGN PATENTS

| | | |
|---|---|---|
| 657,080 | Great Britain | Sept. 12, 1951 |